United States Patent
Witte

(10) Patent No.: US 12,248,362 B2
(45) Date of Patent: Mar. 11, 2025

(54) METHOD FOR RECORDING A NUMBER OF EVENTS IN AN ENCODED TRACER VARIABLE IN A SECURITY-ORIENTED COMPUTER PROGRAM

(71) Applicant: Siemens Aktiengesellschaft, Munich (DE)

(72) Inventor: Karl-Hermann Witte, Fürth (DE)

(73) Assignee: Siemens Aktiengesellschaft, Munich (DE)

( * ) Notice: Subject to any disclaimer, the term of this patent is extended or adjusted under 35 U.S.C. 154(b) by 87 days.

(21) Appl. No.: 18/028,846

(22) PCT Filed: Sep. 3, 2021

(86) PCT No.: PCT/EP2021/074359
§ 371 (c)(1),
(2) Date: Mar. 28, 2023

(87) PCT Pub. No.: WO2022/069154
PCT Pub. Date: Apr. 7, 2022

(65) Prior Publication Data
US 2024/0028440 A1    Jan. 25, 2024

(30) Foreign Application Priority Data
Sep. 29, 2020   (EP) .................................. 20199047

(51) Int. Cl.
*G06F 11/07*   (2006.01)
*G06F 11/28*   (2006.01)

(52) U.S. Cl.
CPC .......... *G06F 11/0775* (2013.01); *G06F 11/28* (2013.01)

(58) Field of Classification Search
CPC ............................ G06F 11/0775; G06F 11/28
See application file for complete search history.

(56) References Cited

U.S. PATENT DOCUMENTS

| 9,195,534 B2 * | 11/2015 | Richter ............... G06F 11/0778 |
| 10,146,655 B2 * | 12/2018 | Dirscherl ............... G06F 11/28 |
| 2013/0262938 A1 | 10/2013 | Schmitt et al. |

FOREIGN PATENT DOCUMENTS

| DE | 102010037457 | 3/2012 |
| DE | 102013218269 | 3/2015 |
| DE | 102014117971 | 6/2016 |

OTHER PUBLICATIONS

International Preliminary Examination Report dated Jan. 10, 2023 based on PCT/EP2021/074359 filed Sep. 3, 2021.

* cited by examiner

*Primary Examiner* — Joseph R Kudirka
(74) *Attorney, Agent, or Firm* — Cozen O'Connor

(57) ABSTRACT

A method, a device and computer program for recording a plurality of events in an encoded tracer variable in a security-oriented computer program, wherein each event is recorded as a value in the encoded tracer variable, where in order to simultaneously record multiple events from the values for the events, a total value is first calculated which is then recorded in the encoded tracer variable, such that multiple independent consistency criteria can be advantageously processed simultaneously to detect and propagate errors or other events and such that by virtue of the simultaneous processing, many dynamic effects are prevented during the detection and propagation of errors/events, thus allowing for the necessary reduced complexity of security programs.

8 Claims, 2 Drawing Sheets

METHOD FOR RECORDING A NUMBER OF EVENTS IN AN ENCODED TRACER VARIABLE IN A SECURITY-ORIENTED COMPUTER PROGRAM

CROSS-REFERENCE TO RELATED APPLICATIONS

This is a U.S. national stage of application No. PCT/EP2021/074359 filed 3 Sep. 2021. Priority is claimed on European Application No. 20199047.0 filed 29 Sep. 2020, the content of which is incorporated herein by reference in its entirety.

BACKGROUND OF THE INVENTION

1. Field of the Invention

The invention relates to a method, device and computer program product for logging a multiplicity of events in a coded tracer variable in a security-oriented computer.

2. Description of the Related Art

In security-oriented programs for industrial applications, which typically run on embedded hardware, such as programmable logic controllers (PLCs) or other industrial automation components, it is necessary to ensure that bit errors in variables are identified and that program portions intended to be executed in a cycle are also actually run through completely.

When processing functionally secure data, internal security function errors must be identified and result in a security response (for example, outputting secure replacement values or a warning notification). This is conventionally achieved by hardware replication and result comparison. One alternative is that of coding the security function using arithmetic codes. Simple arithmetic codes do not identify all errors and must be upgraded appropriately. This typically leads to considerable outlay and/or restricts use.

In more advanced security-oriented solutions, a hardware-independent version of coded processing is used. Coded processing involves detecting and propagating error information in all variables. To date, this has led to complex applications that cannot be replicated appropriately.

There is thus a need for a method of linear complexity for detecting and propagating errors in complex software systems for security-oriented programming by way of arithmetic codes.

Examples of complex applications:
Asynchronous change of data (for example, operations through human machine interface (HMI))
Remanent data
Nested programs (IF-THEN-ELSE, LOOP, and the like)
Global data
CIR (Change in Run—program or execution changes at runtime)
Cloud-based safety applications
According to the current prior art, there are the following solution strategies:
Redundancy/diversity: The security program is executed independently multiple times, such that "common causes" (common error causes) can be ruled out. Depending on the complexity of the application, this approach requires considerable outlay to synchronize the executions and to reliably detect the errors.
In "distributed safety", the actual error rate to be expected is estimated based on the HW model in relation to the CPUs upon which the security program executes. The model must be estimated and defined separately for each HW.
Dynamic signature for each variable: Each variable receives a dynamic signature. This signature is changed each time the variable is changed. The effort in terms of managing the dynamic signature increases with the complexity of the application program. Even in the case of single applications, the effort in terms of management owing to small changes in the control structure has doubled.

In sum, it may be said that the conventional approaches in accordance with the prior art, with the at present greatly increasing complexity in terms of requirements, are becoming less and less suitable as a general solution for new innovations. They have to be supplemented with complexity management measures.

DE 10 2014 117 971 A1—Fetzer "Method for processing data in order to ascertain if an error has occurred while running a program, and data processing arrangements for generating program code" discloses logging the execution of program blocks by summing the signatures of the program blocks in an accumulator memory and comparing the content thereof with a prescribed value.

One problem is that states, state changes, log information (in particular about the program running), error information or the like, called "events" or "criteria" for short below, which occur synchronously or close in time to one another, are often not logged promptly or simultaneously in a log variable (called "tracer variable" below). This is often due to the fact that associated corresponding instructions in a source code in a computer program can be executed temporally separately from one another following compilation, or for example an interrupt in the program execution occurs in the meantime. This may give rise to inconsistent states, in particular for the tracer variable and structures (in particular control structures) dependent thereon.

SUMMARY OF THE INVENTION

In view of the foregoing, it is therefore an object of the present invention to provide a method for improve the logging of events in tracer variables.

This and other objects and advantages are achieved in accordance with the invention by a device, computer program and method in which the securing occurs in the same way as the arithmetic coding. Multiple events ("criteria") are stored independently from one another within a tracer variable. For each criterion, the value is stored in a manner arithmetically coded in the "tracer", where, in accordance with the invention, multiple criteria or events are first combined and then, in a computing step and thus at the same time, stored in the tracer variable.

Thus, a method is provided for logging a multiplicity of events in a coded tracer variable in a security-oriented computer program, where each event is logged in the form of a value in the coded tracer variable. Here, a total value is first calculated for simultaneous logging of multiple events from the values for these events and is then logged in the coded tracer variable. This has the advantage of allowing simultaneous processing of multiple independent consistency criteria for detecting and propagating errors or other events. The simultaneity avoids a large number of dynamic effects when detecting and propagating errors/events. This enables the required reduction in the complexity of security programs.

The objects and advantages are also achieved in accordance with the invention by a device including a processor and memory, and by a computer program product for logging a multiplicity of events in a coded tracer variable in a security-oriented computer program, where the device, and the computer program product, when executed, are configured to perform the method in accordance with the invention. This makes it possible to achieve the advantages explained with reference to the method.

In one advantageous embodiment of the method, AN, ANB or ANBD coding is used to code the coded variable. These coding operations are successfully incorporated in security-oriented computer programs, in particular in those used in automation engineering.

In a first advantageous embodiment, the events are logged as a coded value in the coded tracer variable while, in another advantageous embodiment, the events are logged in a signature of the coded tracer variable. Mixed forms are possible, for example, by logging first events in the "payload", i.e., as a value, and other events in the signature.

Advantageously, a constant is defined for each event, where this constant represents the value for the applicability of the event. Boolean information (true/false) is thus, for example, mapped onto a broad bit value, in which only exactly one value corresponds to "true", which increases security in the event of bit errors.

In one advantageous embodiment, the computer program performs a consistency check on the tracer variable, where error handling is performed at least in the event of an inconsistency. Error handling is thus possible.

When each event of each type of an event is coded with a separate constant, where the constants of the various events or the various types are selected to be co-prime to one another, it is possible to log multiple events or types of events in a common coded variable, the tracer variable (or "error variable").

Advantageously, with the event, a respective expected value for the event is logged in the coded tracer variable. As a result, errors, such as program running errors, can be identified just by evaluating the tracer variable, without having to perform a comparison of the content of the tracer variable with externally stored expected values.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

One exemplary embodiment of the method in accordance with the invention is explained below with reference to the drawings, which are used simultaneously to explain an exemplary embodiment of a device, and a computer program product of this kind, in which.

DETAILED DESCRIPTION OF THE EXEMPLARY EMBODIMENTS

In order to check program execution and to log events of all kinds, the prior art uses running variables, so-called tracer variables or "tracer" for short, using the content of which the program path that is run through or the occurrence of criteria, events, states or the like can be logged and thus checked.

Figure 1:
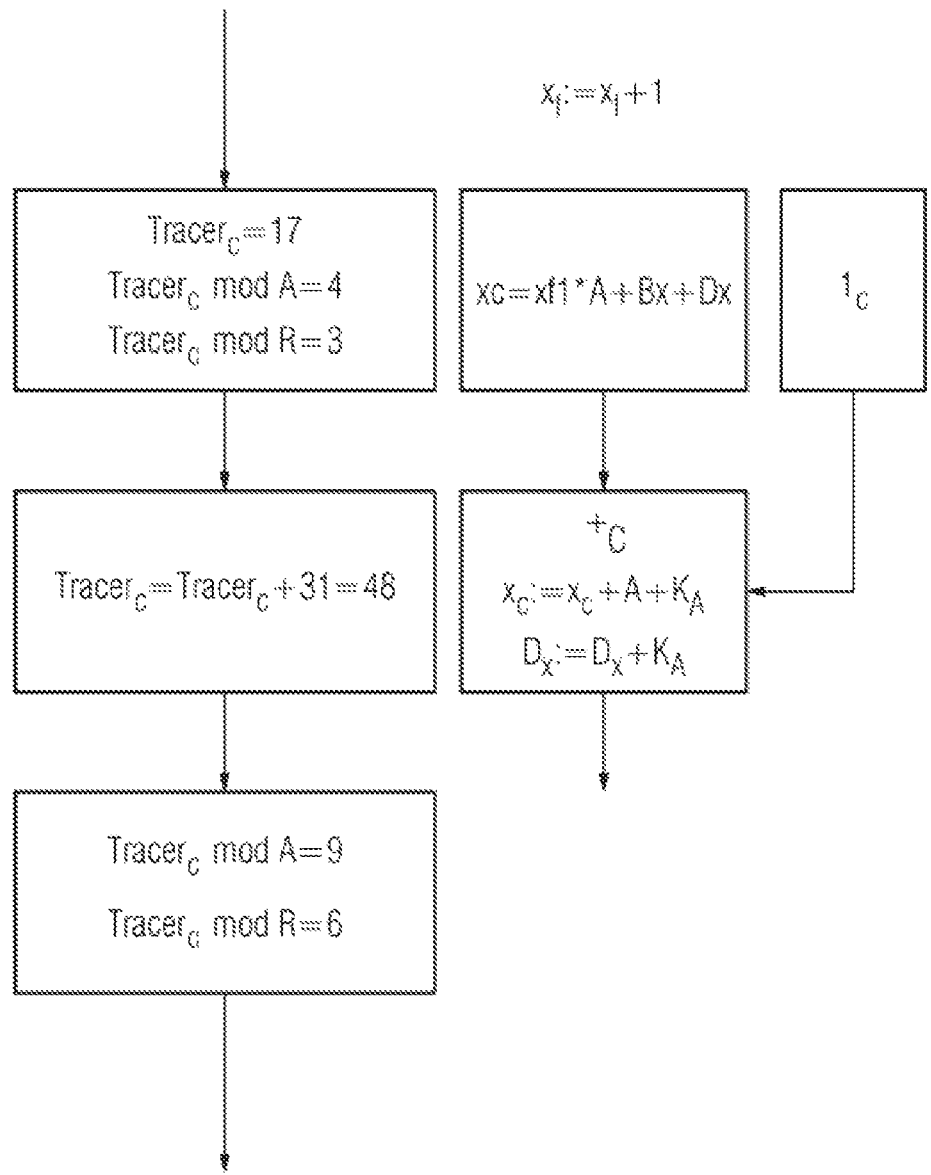
FIG. 1 shows the securing of an addition to form a coded variable and at the same time the securing of the execution of a program section, in accordance with the invention.

With reference to FIG. 1, in the present example, the tracer variable $Tracer_c$ is used to secure an addition and to simultaneously execute a program section of the computer program. The present example in this regard shows the coded variable $x_c$.

In the present example, without restricting generality, the variable $x_c$ is ANDB-coded in accordance with a rule in the form:

$$x_c := x_f * A + B_x + D_x$$

The complexity of the security program is particularly dependent on the security against errors in the dynamic behavior of the security program.

Typical security measures are:
1. Dynamic signature $D_x$
2. Tracer (tracer variable)
3. Propagation variable New information is typically recorded in one of these signatures such that either a constant or a variable with an unambiguous expectation is added. Mixed forms are possible. By way of example, the tracer variable, the main purpose of which is conventionally that of logging the linear program blocks that are run through, may at the same time be used to propagate error information or state information (for example, events or "criteria").

For complete security, the simultaneous change of multiple independent aspects is often necessary. This simultaneity must also be secured in the compiled program code, it thus being necessary to take into consideration the fact that compilers can perform optimizations that are generally advantageous for the program execution, but on the other hand do not guarantee that instructions that are programmed in relation thereto in the source code are actually executed promptly or quasi-simultaneously in the executable program. A separate solution in this regard is currently sought for each problem.

The securing or security-oriented logging of events or criteria (state information, state changes, trace information, etc.) occurs in the same way as conventional arithmetic coding. Multiple criteria $K_1 \ldots K_n$ are stored independently within a tracer variable. For each criterion $K_i$, the value is stored in a manner arithmetically coded in $Tracer_c$.

In a first embodiment, the criteria are represented in coded form. In other words, the sum formed arithmetically in the coded space stores the information to be logged as a coded value of the tracer variable, i.e., as a "payload":

$$Tracer_c = A^i * K_i + B_{Tracer} + D_{Tracer,i}$$

The complete formula for a number i of criteria is:

$$Tracer_c = (\Sigma^D_{i \times L} A^i * K_i) + B_{Tracer} + D_{Tracer}$$

As evident, it holds that:

$$D_{Tracer,i} = D_{Tracer} + (\Sigma^1_{j=1} A^j * K_j) = (\Sigma^0_{j=k+1} A^j * K_j)$$

If at the same time $K_i$ should be changed by $\Delta K_i$ and $K_j$ should be changed by $\Delta K_j$, then this results in a change of $$\Delta \text{Tracer} = \Delta K_i * A^1 * \Delta K_j * A^i.$$

In the program, $$\text{Tracer}_c = \text{Tracer}_c + \Delta \text{Tracer}$$

is then executed. In many cases, $\Delta K_i$ and $\Delta K_j$ are constants. In these cases, $\Delta \text{Tracer}$ is also a constant. If a value $\Delta k_i$ with an unambiguous expectation $\Delta K_i^{expected}$ should be added, then this takes place through the generally applicable form:

$$\Delta \text{Tracer} = n*\Delta K_A + \Delta K_i^{expected}*(A^i - n) + \Delta K_j + m*\Delta K_j^{expected}*(A^j - m)$$

In this case, n and m are selected such that the error information defined by the criteria is transmitted securely. Otherwise, there are no restrictions for the selection of n and m.

In a second embodiment, the criteria form the signature of a coded value, and are thus preferably represented in the dynamic signature of the tracer variable:

$$\text{Tracer}_c = A_1 * X + B_i + K_i$$

For each criterion, a constant $E_i$ is determined, this representing the value 1 for this criterion:

$$E_i \text{ MOD } A_i = 1$$

$$E_i \text{ MOD } A_j = 0 \text{ if } i \neq j$$

If at the same time $K_i$ should be changed by $\Delta K_i$ and $K_j$ should be changed by $\Delta K_j$, then this results in a change of $$\Delta \text{Tracer} = \Delta K_i * E_i + \Delta K_j * E_j.$$

In the program, $\text{Tracer}_c = \Delta \text{Tracer}_c + \Delta \text{Tracer}$ is then executed.

In many cases, $\Delta K_i$ and $\Delta K_j$ are constants. In these cases, $\Delta \text{Tracer}$ is also a constant. If a value $Oki$ with an unambiguous expectation $\Delta K_i^{expected}$ should be added, then this occurs through the generally applicable form:

$$\Delta \text{Tracer} = n*\Delta K_1 + \Delta K_i^{expected}*(E_i - n) + \Delta K_j + m*\Delta K_j^{expected}*(E_j - m)$$

In this case, n and m are again selected such that the error information defined by the criteria is transmitted securely. Otherwise, there are no restrictions for the selection of n and m.

In both embodiments, following the addition of $\Delta \text{Tracer}$, there may be an additional correction in order to avoid systematic errors. By way of example, modulo operations may be used to avoid or "remove" overflows that may occur due to the multiple addition of information in the coded region.

The criteria that are specifically required is not part of this invention. These are given by the security requirements in the specific application case. Typical criteria (or generally: events) are:
- The program running is correct: this may be checked by a machine with one state per basic block.
- The value profile of the execution conditions has to correspond to the actual execution.
- Timestamp or dynamic signature of the data
- Check signature for an operation.

The key advantage is that of allowing simultaneous processing of multiple independent consistency criteria for detecting and propagating errors. The simultaneity avoids a large number of dynamic effects when detecting and propagating errors. This enables the required reduction in the complexity of security programs.

FIG. 1 illustrates the execution of the coding operations to give $$x_f' = x_f + 1$$

where the right-hand part of FIG. 1 illustrates the actual operation and the left-hand part of the figure illustrates the logging in the tracer variable.

The following values are defined:
A=13 and R=7;
$K_A = (\Sigma D_x) \bmod A = 4$ and $K_R = D_{Tracer} = 10$;
$\Delta K_A = 5$ and $\Delta K_R = 3$ Modular Coding Variant:
$D_{Tracer} \bmod 7 = 10 \bmod 7 = 3$
$E_A = 14$ and $E_R = 78$
$\text{Tracer}_c = (4*78 + 3*14) \bmod (7*13) = 17$ $$\Delta \text{Tracer} = (\Delta K_A * E_A + \Delta K_R * E_R) \bmod A * R$$
$$= (5*14 + 3*78) \bmod 91$$
$$= 31$$

It holds that:

$(\text{Tracer}_c + \Delta \text{Tracer}) \bmod A = (K_A + \Delta K_A) \bmod A = 48 \bmod 13 = 9$ $(\text{Tracer}_c + \Delta \text{Tracer}) \bmod R = (K_R + \Delta K_R) \bmod A = 48 \bmod 7 = 6$ ANDB-Coded Variant:

$\text{Tracer}_c = ((\Sigma D_x) \bmod A)*A^2 + (D_{Tracer} \bmod A)*A + B_{Tracer} + D_{Program}$ $B_{Tracer}$ and $D_{program}$ are not relevant to the invention and are therefore set to 0.

$\rightarrow \text{Tracer}_c = 4*169 + 10*13 = 806$ $E_A = 13^2 = 169$ and $E_R = 13$ $$\Delta \text{Tracer} = \Delta K_A * E_A + \Delta K_R * E_R$$
$$= 5*169 + 3*13$$
$$= 004$$

Since $K_R + \Delta K_R \leq 13$, the overflow must be handled for $K_R$. It is necessary to subtract $R_R * A = 169$.

$\rightarrow \Delta \text{Tracer} = 715!$

It holds that:

$(\text{Tracer}_c + \Delta \text{Tracer})/A^2) \bmod A = (K_A + \Delta K_A) \bmod A = 9$ $(\text{Tracer}_c + \Delta \text{Tracer})/A) \bmod A = (K_R + \Delta K_R) \bmod A = 0$ In the arithmetic (coded) addition of 1 to $x_f$, the number 1 is represented by 1*A, such that 1*A (=A) is added to $x_c$ and the signature of the coded 1 (specifically $K_A$) is added to the previous dynamic signature of $x_c$.

The first criterion is thus given by the correct addition, as a result of which the tracer variable $D_{Tracer}$ is supplemented with the corresponding value $\Delta K_A = 5$ provided previously for a correct addition.

The second criterion is, for example, a dynamic signature (D-signature) and is used to check the correct execution order. In the present case, for this purpose, in accordance with the previous stipulation ($\Delta K_R = 3$), the number 3 is thus added to $D_{Tracer}$.

Both changes, however, must occur arithmetically; in other words, $\Delta K_A=5$ and $\Delta K_R=3$ must be "added" in coded form to the tracer variable.

As a result:

$E_A=14$ and $E_R=78$ $$\Delta \text{Tracer} = (5*14+3*78) \bmod (7*13) = 304 \bmod 91 = 31$$

Adding the 31 to the original value 17 of the tracer variable $\text{Tracer}_c$ thus logs both criteria in the tracer variable simultaneously, i.e., in a step also cannot be separated by the compiler or interrupt.

A consistency check may then occur at the end of the program; this is illustrated in the last block on the left-hand side of FIG. 1. One option is to obtain the individual components again through modulo operations:

$\text{Tracer}_c \bmod A = 9$ $\text{Tracer}_c \bmod R = 6$

These may then be compared with expected values.

$(\text{Tracer}_c - D_{Tracer}) \bmod R = 0$ $\text{Tracer}_c \bmod A = (\Sigma D_x) \bmod A$ In order to avoid/manage overflows, the value of the tracer may be limited, for example by $\text{Tracer}_c := \text{Tracer}_c \bmod A*R$. $D_{Tracer}$ is calculated securely in accordance with known methods in coded processing. All execution-relevant conditions are in this case incorporated directly when forming $D_{Tracer}$.

Following a negative result of the consistency check, a corresponding pre-programmed response or error handling may take place. In one simple case, the underlying system is in the process put into a safe state (for example emergency off) and/or a warning notification is output.

Figure 2:
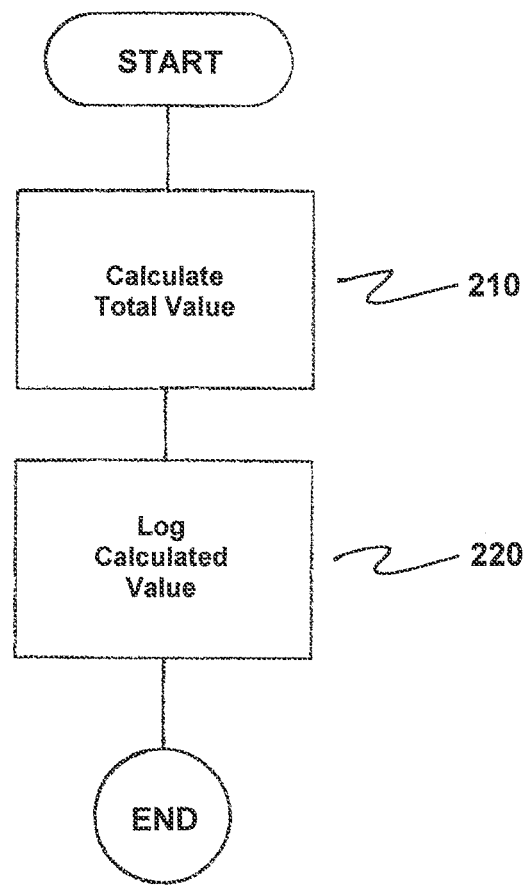
FIG. 2 is a flowchart of the method in accordance with the invention.

FIG. 2 is a flowchart of the method for logging a multiplicity of events in a coded tracer variable Tracerc in a security-oriented computer program, each event being logged as a respective value in the coded tracer variable Tracerc. The method comprises calculating a total value for simultaneous logging of a plurality of events from the values for these events, as indicated in step 210. Next, the calculated value is logged in the coded tracer variable Tracerc, as indicated in step 220.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for logging a plurality of events in a coded tracer variable in a security-oriented computer program executing on at least one industrial automation component of an industrial automation system, each event being logged as a respective value in the coded tracer variable, the method comprising:
    calculating a total value for simultaneous logging of the plurality of events from respective values for the plurality of events;
    logging the calculated value in the coded tracer variable; and
    switching the at least one industrial automation component of the industrial automation system into a safe state based on the calculated value logged in the coded tracer variable.

2. The method as claimed in claim 1, wherein the plurality of events are logged as a coded value in the coded tracer variable.

3. The method as claimed in claim 1, wherein the plurality of events are logged in a signature of the coded tracer variable.

4. The method as claimed in claim 1, wherein a constant is defined for each event or for each type of an event of the plurality of plurality of events; and wherein said defined constant represents a value for an applicability of the event of the plurality of events.

5. The method as claimed in claim 4, wherein constants of various events or various types are selected to be co-prime to one another.

6. The method as claimed in claim 1, wherein the computer program performs a consistency check on the tracer variable; and wherein error handling is performed at least in an event of an inconsistency.

7. The method as claimed in claim 1, wherein, with each event, a respective expected value for each event is logged in the coded tracer variable.

8. A device for logging a plurality of events in a coded tracer variable in a security-oriented computer program executing on at least one industrial automation component of an industrial automation system, each event being logged as a respective value in the coded tracer variable, the device comprising:
    a processor; and
    memory;
    wherein the processor is configured to:
        calculate a total value for simultaneous logging of the plurality of events from values for the plurality of events; and
        log the calculated value in the coded tracer variable; and
    wherein the at least one industrial automation component of the industrial automation system is switched into a safe state based on the calculated value logged in the coded tracer variable.

* * * * *